United States Patent
Partovi et al.

(10) Patent No.: US 7,813,289 B2
(45) Date of Patent: Oct. 12, 2010

(54) ELECTRICAL IDLE DETECTION CIRCUIT INCLUDING INPUT SIGNAL RECTIFIER

(75) Inventors: Hamid Partovi, Sunnyvale, CA (US); Karthik Gopalakrishnan, San Jose, CA (US); Luca Ravezzi, Palo Alto, CA (US)

(73) Assignee: Infineon Technologies AG, Neubiberg (DE)

( * ) Notice: Subject to any disclaimer, the term of this patent is extended or adjusted under 35 U.S.C. 154(b) by 1289 days.

(21) Appl. No.: 11/346,064

(22) Filed: Feb. 2, 2006

(65) Prior Publication Data

US 2007/0180281 A1    Aug. 2, 2007

(51) Int. Cl.
*H04L 1/00*    (2006.01)
(52) U.S. Cl. .................... 370/241; 370/251
(58) Field of Classification Search .......... 370/241, 370/246, 247, 250, 251
See application file for complete search history.

(56) References Cited

U.S. PATENT DOCUMENTS

| | | | |
|---|---|---|---|
| 3,936,609 A * | 2/1976 | Waldeck | 370/524 |
| 4,245,182 A * | 1/1981 | Aotsu et al. | 322/20 |
| 4,459,490 A * | 7/1984 | Brandon | 290/40 B |
| 5,991,887 A | 11/1999 | Ezell | |
| 6,151,648 A | 11/2000 | Haq | |
| 6,300,879 B1 | 10/2001 | Regan et al. | |
| 6,747,498 B1 | 6/2004 | Pauletti et al. | |
| 2004/0120343 A1 | 6/2004 | Kawashima | |
| 2006/0198482 A1 | 9/2006 | Meltzer et al. | |
| 2006/0215794 A1 | 9/2006 | Murugan et al. | |

* cited by examiner

*Primary Examiner*—Hong Cho
(74) *Attorney, Agent, or Firm*—Dicke, Billig & Czaja, PLLC

(57) ABSTRACT

An electrical idle detection circuit including a full wave rectifier and a first amplifier. The full wave rectifier is configured to receive differential input signals and provide a rectified output signal based on the differential input signals. The first amplifier is configured to receive a first input signal based on the rectified output signal and a second input signal based on a reference signal. The first amplifier is configured to provide an output signal that indicates the differential input signals are one of active and in electrical idle based on the first input signal and the second input signal.

20 Claims, 7 Drawing Sheets

| AMB ELECTRICAL IDLE SPECIFICATION | | |
|---|---|---|
| | ACTIVE MODE | ELECTRICAL IDLE |
| $V_{DM}$ - AC (DIFF. PK-PK) | 160mV | 0 |
| $V_{CM}$ - DC | 120mV | 50 mV |
| $V_{CM}$ - AC (PK-PK) | 70mV @80MHz 50mV @100MHz 150mV @2.4GHz | 60 mV @ 80MHz |
| DETECTION TIME | 10ns | 20 nS |

Fig. 2

| PCIe ELECTRICAL IDLE SPECIFICATION | | |
|---|---|---|
| | ACTIVE MODE | ELECTRICAL IDLE |
| $V_{DM}$ - AC (DIFF. PK-PK) | 175mV | 65mV |
| $V_{CM}$ | NOT APPLICABLE (AC COUPLED) | NOT APPLICABLE (AC COUPLED) |
| DETECTION TIME | | 10ms |

ELECTRICAL IDLE DETECTION CIRCUIT INCLUDING INPUT SIGNAL RECTIFIER

BACKGROUND

Typically, a computer system includes a number of integrated circuits that communicate with one another to perform system applications. Often, the computer system includes one or more host controllers and one or more electronic subsystem assemblies, such as a dual in-line memory module (DIMM), a graphics card, an audio card, a facsimile card, and a modem card. To perform system functions, the host controller(s) and subsystem assemblies communicate via communication links, such as serial communication links and parallel communication links. Serial communication links include links that implement the fully buffered DIMM (FB-DIMM) advanced memory buffer (AMB) standard, the peripheral component interconnect express (PCIe) standard, or any other suitable serial communication link interface.

An AMB chip is a key device in a FB-DIMM. The AMB has two serial links, one for upstream traffic and the other for downstream traffic, and a bus to on-board memory, such as dynamic random access memory (DRAM) in the FB-DIMM. Serial data from the host controller sent through the downstream serial link (southbound) is temporarily buffered, and then sent to memory in the FB-DIMM. The serial data contains the address, data, and command information given to the memory, converted in the AMB, and sent out to the memory bus. The AMB writes in and reads out from the memory as instructed by the host controller. The read data is converted to serial data, and sent back to the host controller on the upstream serial link (northbound).

The AMB also performs as a repeater between FB-DIMMs on the same channel. The AMB transfers information from a primary southbound link connected to the host controller or an upper AMB to a lower AMB in the next FB-DIMM via a secondary southbound link. The AMB receives information in the lower FB-DIMM from a secondary northbound link, and after merging the information with information of its own, sends it to the upper AMB or host controller via a primary northbound link. This forms a daisy-chain among FB-DIMMs.

A key attribute of the FB-DIMM channel architecture is the high-speed, serial, point-to-point connection between the host controller and FB-DIMMs on the channel. The AMB standard is based on serial differential signaling, similar to PCIe.

PCIe is a high-speed, serial link that communicates data via differential signal pairs. A PCIe link is built around a bidirectional, serial, point-to-point connection known as a "lane". At the electrical level, each lane utilizes two unidirectional low voltage differential signaling pairs, a transmit pair and a receive pair, for a total of 4 data wires per lane. A connection between any two PCIe devices is known as a "link", and is built up from a collection of 1 or more lanes. All devices minimally support single-lane (×1) links. Devices may optionally support wider links composed of ×2, ×4, ×8, ×12, ×16, ×32, or more lanes.

The AMB and PCIe communication links use electrical idle as an electrical mechanism to signal state transitions. In an AMB chip, entering electrical idle is an indicator that a state has been completed and the AMB can be transitioned to the next state. Exiting electrical idle, i.e., entering the active mode, allows the next state to commence as the AMB receives active differential input signals on the inputs of the high-speed serial AMB link. Also, inband reset events are signaled by entry into electrical idle, which causes AMB's to complete a transition to the disabled or inactive state. In addition, in the event temperature exceeds a temperature limit, the AMB is disabled via entering the electrical idle state. The AMB and PCIe communication standards do not define dedicated inband signals for control.

For these and other reasons there is a need for the present invention.

SUMMARY

One aspect of the present invention provides an electrical idle detection circuit including a full wave rectifier and a first amplifier. The full wave rectifier is configured to receive differential input signals and provide a rectified output signal based on the differential input signals. The first amplifier is configured to receive a first input signal based on the rectified output signal and a second input signal based on a reference signal. The first amplifier is configured to provide an output signal that indicates the differential input signals are one of active and in electrical idle based on the first input signal and the second input signal.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 2 is a table including an AMB electrical idle specification.

FIG. 3 is a table including a PCIe electrical idle specification.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
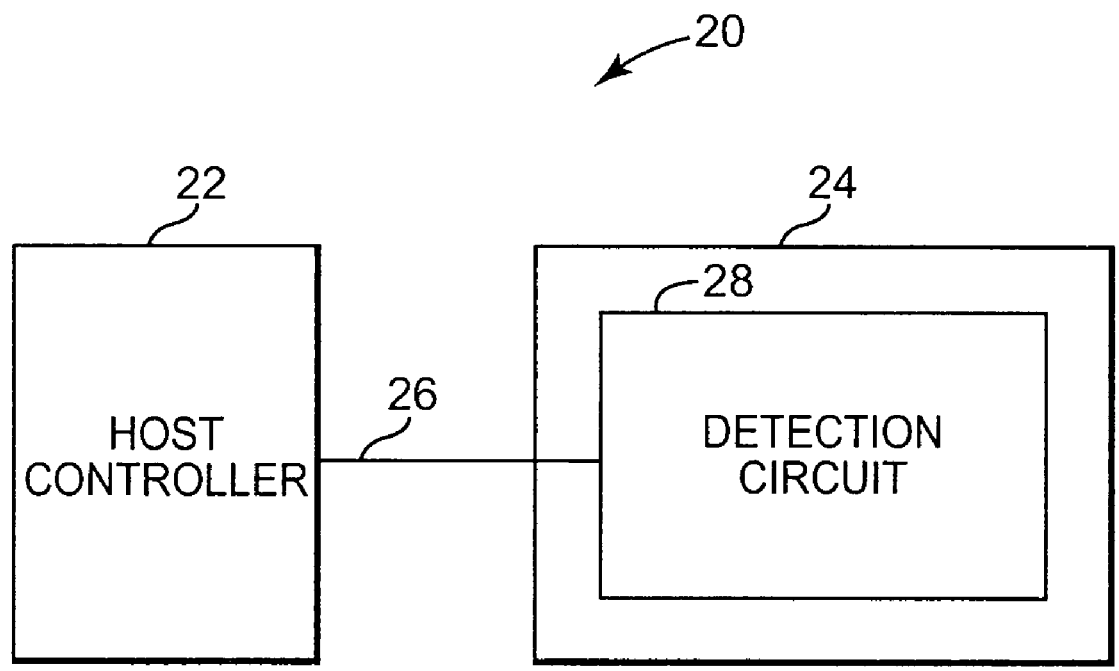
FIG. 1 is a diagram illustrating one embodiment of a computer system according to the present invention.

FIG. 1 is a diagram illustrating one embodiment of a computer system according to the present invention. Computer system 20 includes a host controller 22 and a subsystem assembly 24. Host controller 22 is electrically coupled to subsystem assembly 24 via serial communications link 26. Host controller 22 controls subsystem assembly 24 via serial communications link 26 to provide a system function. In one embodiment, host controller 22 is a memory controller. In one embodiment, subsystem assembly 24 is a FB-DIMM and host controller 22 controls the FB-DIMM to provide a system memory function. In other embodiments, subsystem assembly 24 is any suitable subsystem assembly, such as a graphics card, an audio card, a facsimile card, and a modem card, and host controller 22 controls subsystem assembly 24 to provide the corresponding system function.

Subsystem assembly 24 includes an electrical idle detection circuit 28 that is electrically coupled to host controller 22 via serial communications link 26. Electrical idle detection circuit 28 detects signal activity on serial communications link 26 and provides an output signal that indicates whether serial communications link 26 is active or in electrical idle.

In one embodiment, electrical idle detection circuit 28 is configured to receive differential input signals via serial communications link 26 and provide a rectified output signal based on the differential input signals. If the differential input signals are active and communicating data, the rectified output signal actively changes an internal voltage value to indicate that the differential input signals are active. If the differential input signals are in electrical idle, the rectified output signal is inactive and the internal voltage value remains unchanged to indicate that the differential input signals are in electrical idle.

In one embodiment, electrical idle detection circuit 28 is configured to receive differential input signals via serial communications link 26 and reduce the common mode voltage noise in the differential input signals to provide a filtered common mode voltage. Electrical idle detection circuit 28 provides differential output signals based on the filtered common mode voltage to indicate whether the differential input signals are active or in electrical idle. If the filtered common mode voltage exceeds a common mode reference voltage, electrical idle detection circuit 28 indicates the differential input signals are active. If the filtered common mode voltage is less than the common mode reference voltage, electrical idle detection circuit 28 indicates the differential input signals are in electrical idle.

In one embodiment, electrical idle detection circuit 28 receives differential input signals via serial communications link 26 and detects whether the differential input signals are active or in electrical idle via the rectified output signal and the filtered common mode voltage methods.

Serial communications link 26 includes one or more differential signal pairs that communicate data between host computer 22 and subsystem assembly 24. In one embodiment, serial communications link 26 includes one differential signal pair. In one embodiment, serial communications link 26 includes multiple differential signal pairs that communicate data bi-directionally via serial communications link 26.

In one embodiment, subsystem assembly 24 is an FB-DIMM that is one of multiple FB-DIMMs daisy-chained to host controller 22 via serial communications link 26. Each of the daisy-chained FB-DIMMs includes an AMB that provides an FB-DIMM AMB communications link. Also, each of the FB-DIMMs includes one or more electrical idle detection circuits 28 that detect whether differential signal pairs of serial communications link 26 are active or in electrical idle. In the AMB communications link, if the differential signal level and common mode voltage level of received differential input signals are high, serial communications link 26 is active. If the differential signal level and common mode voltage level of received differential input signals are low, serial communications link 26 is in electrical idle.

In one embodiment, host controller 22 and subsystem assembly 24 provide a PCIe communications link to communicate via serial communications link 26. The PCIe communications link is an AC-coupled interface and signal activity is detected via the differential signal level. In a PCIe communications link, serial communications link 26 is active if the differential signal level is above a certain voltage level. Serial communications link 26 is in electrical idle if the differential signal level falls below the voltage level. In other embodiments, host controller 22 and subsystem assembly 24 communicate via any suitable communications link.

Electrical idle detection circuit 28 differentiates between an active state and an electrical idle state at the receiving end of serial communications link 26. Electrical idle detection circuit 28 operates over a suitably large bandwidth and with a suitably fine resolution. In one embodiment, electrical idle detection circuit 28 differentiates between valid, but deteriorated, differential levels of serial data at 4.8 gigabits per second (Gb/s) and the differential and common mode noise in electrical idle.

FIG. 2 is a table including an AMB electrical idle specification 40. Electrical idle detection circuit 28 detects activity or electrical idle in an AMB communication link via the differential mode voltage (VDM) at 42 and/or the DC component of the common mode voltage (VCM) at 44. In the active mode, the AC differential peak to peak voltage of the VDM at 42 is specified at 160 millivolts (mV). In electrical idle the AC differential peak to peak voltage of the VDM at 42 is specified at zero volts. The DC component of the VCM at 44 in the active mode is specified at 120 mV and the DC component of the VCM at 44 in electrical idle is specified at 50 mV. Detection times at 48 in the AMB electrical idle specification 40 include an active mode detection time of 10 nanoseconds (ns) and an electrical idle detection time of 20 ns.

In one embodiment of the electrical idle detection circuit 28, the difference between the VDM at 42 in the active mode and the VDM at 42 in electrical idle is used to detect activity or electrical idle in the AMB communications link. In one embodiment of the electrical idle detection circuit 28, the difference in the DC component of the VCM at 44 in the active mode and the DC component of the VCM at 44 in electrical idle is used to detect activity or electrical idle in the AMB communications link. In one embodiment of the electrical idle detection circuit 28, the difference between the VDM at 42 in the active mode and the VDM at 42 in electrical idle and the difference in the DC component of the VCM at 44 in the active mode and the DC component of the VCM at 44 in electrical idle are used to detect activity or electrical idle in the AMB communications link.

The AC peak to peak noise of the VCM at 46 is specified at different levels for different frequencies. In the active mode, the AC peak to peak noise of the VCM at 46 is specified as 70 mV at 80 Mega-Hertz (MHz), 50 mV at 100 MHz, and 150 mV at 2.4 Giga-Hertz (GHz). In electrical idle, the AC peak to peak noise of the VCM at 46 is specified as 60 mV at 80 MHz. In one embodiment, electrical idle detection circuit 28 filters off the AC peak to peak noise of the VCM at 46 to obtain a filtered DC component of the VCM that is used to detect activity or electrical idle in the AMB communications link.

FIG. 3 is a table including a PCIe electrical idle specification 60. Electrical idle detection circuit 28 detects activity or electrical idle in a PCIe communication link via the PCIe VDM at 62. The PCIe communications link is an AC coupled interface that filters off the DC component of the VCM at 64 and the DC component of the VCM at 64 is not used to detect activity or electrical idle in a PCIe communication link.

In the active mode, the AC differential peak to peak voltage of the VDM at 62 is specified at 175 mV. In electrical idle the AC differential peak to peak voltage of the VDM at 62 is specified at 65 mV. Detection time at 66 in the PCIe electrical idle specification 60 includes an electrical idle detection time of 10 milli-seconds (ms).

In one embodiment of electrical idle detection circuit 28, the difference between the VDM at 62 in the active mode and the VDM at 62 in electrical idle is used to detect activity or electrical idle in the PCIe communications link.

Figure 4:
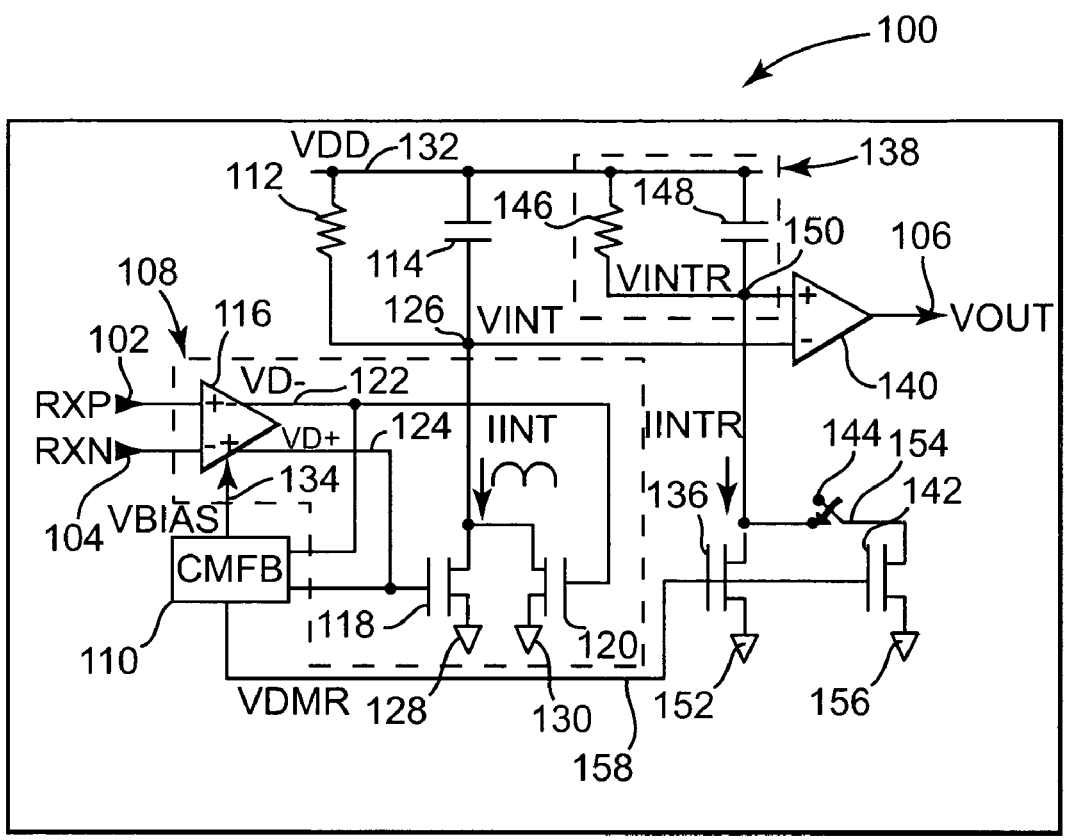
FIG. 4 is a diagram illustrating one embodiment of an electrical idle detection circuit.

FIG. 4 is a diagram illustrating one embodiment of an electrical idle detection circuit 100. Electrical idle detection circuit 100 is similar to and can be employed in electrical idle detection circuit 28 to receive differential input signals of one channel in a serial communications link, such as serial communications link 26. Electrical idle detection circuit 100 receives a positive differential input signal RXP at 102 and a negative differential input signal RXN at 104 and provides output signal VOUT at 106. Output signal VOUT at 106 indicates whether differential input signals RXP at 102 and RXN at 104 are active or in electrical idle. In one embodiment, differential input signals RXP at 102 and RXN at 104 are signals in an AMB communications link. In one embodiment, differential input signals RXP at 102 and RXN at 104 are signals in a PCIe communications link. In other embodiments, differential input signals RXP at 102 and RXN at 104 are signals in any suitable communications link.

Electrical idle detection circuit 100 detects whether the differential input signals RXP at 102 and RXN at 104 are active or in electrical idle via the VDM of differential input signals RXP at 102 and RXN at 104. Electrical idle detection circuit 100 provides a suitably high gain and a suitably large bandwidth to detect small voltage differences and reliably determine transitions into and out of electrical idle within the detection times.

Electrical idle detection circuit 100 includes a full wave rectifier circuit 108, a common mode feedback circuit 110, a pull-up resistor 112, and a filter capacitor 114. Full wave rectifier 108 includes a receiver amplifier 116 and a pair of n-channel metal oxide semiconductor (NMOS) transistors 118 and 120. Receiver amplifier 116 is electrically coupled to the gate of NMOS transistor 120 and to common mode feedback circuit 110 via negative output path 122. Receiver amplifier 116 is electrically coupled to the gate of NMOS transistor 118 and to common mode feedback circuit 110 via positive output path 124. Receiver amplifier 116 receives differential input signals RXP at 102 and RXN at 104 and amplifies the input signals to provide differential output signals VD− and VD+. Differential output signal VD− is provided via negative output path 122 and differential output signal VD+ is provided via positive output path 124.

One side of the drain-source path of NMOS transistor 118 is electrically coupled to one side of the drain-source path of NMOS transistor 120 via negative input path 126. Also, the drain-source paths of NMOS transistors 118 and 120 are electrically coupled to one side of pull-up resistor 112 and one side of filter capacitor 114 via negative input path 126. The other side of the drain-source path of NMOS transistor 118 is electrically coupled to a reference voltage, such as ground, at 128 and the other side of the drain-source path of NMOS transistor 120 is electrically coupled to a reference voltage, such as ground, at 130. The other side of pull-up resistor 112 and the other side of filter capacitor 114 are electrically coupled to VDD at 132.

Common mode feedback circuit 110 receives differential output signal VD− via negative output path 122 and differential output signal VD+ via positive output path 124 and DC averages the differential output signals VD− at 122 and VD+ at 124 to provide bias voltage VBIAS via bias output path 134. Common mode feedback circuit 110 is electrically coupled to receiver amplifier 116 via bias output path 132 and receiver amplifier 116 receives the bias voltage VBIAS and adjusts the common mode voltage level of each of the differential output signals VD− at 122 and VD+ at 124 to be substantially equal to the threshold voltage of each of the NMOS transistors 118 and 120. If the AC differential peak to peak VDM of differential input signals RXP at 102 and RXN at 104 is substantially equal to zero volts, receiver amplifier 116 sets each of the differential output signals VD− at 122 and VD+ at 124 to substantially the threshold voltage of each of the NMOS transistors 118 and 120. This places each of the NMOS transistors 118 and 120 at the edge of conduction, where each of the NMOS transistors 118 and 120 draw negligible current.

Electrical idle detection circuit 100 also includes a reference transistor 136, a reference load 138, an output amplifier 140, a hysterisis transistor 142, and a hysterisis switch 144. Reference load 138 includes a reference resistor 146 coupled in parallel to a reference capacitor 148. One side of reference resistor 146 and one side of reference capacitor 148 are electrically coupled to VDD at 132. The other side of reference resistor 146 and the other side of reference capacitor 148 are electrically coupled to one side of the drain-source path of reference transistor 136 and to the positive input of output amplifier 140 via positive input path 150. The other side of the drain-source path of reference transistor 136 is electrically coupled to a reference, such as ground, at 152. The negative input of output amplifier 140 is electrically coupled to the drain-source paths of NMOS transistors 118 and 120, one side of pull-up resistor 112, and one side of filter capacitor 114 via negative input path 126. Output amplifier 140 receives input signals via positive input path 150 and negative input path 126 and provides output signal VOUT at 106.

One side of hysterisis switch 144 is electrically coupled to reference resistor 146, reference capacitor 148, the drain-source path of reference transistor 136, and the positive input of output amplifier 140 via positive input path 150. The other side of hysterisis switch 144 is electrically coupled to one side of the drain-source path of hysterisis transistor 146 via hysterisis path 154. The other side of the drain source path of hysterisis transistor 146 is electrically coupled to a reference, such as ground, at 156. The gate of reference transistor 136 and the gate of hysterisis transistor 142 are electrically coupled to common mode feedback circuit 110 via differential mode reference voltage path 158.

Common mode feedback circuit 110 provides differential mode reference voltage VDMR at 158 to the gates of reference transistor 136 and hysterisis transistor 142. NMOS transistor 118, NMOS transistor 120, reference transistor 136, and hysterisis transistor 142 have substantially the same threshold voltage and VDMR at 158 is greater than the threshold voltage of NMOS transistors 118 and 120, reference transistor 136, and hysterisis transistor 142. VDMR at 158 biases reference transistor 136 to turn on and draw current IINTR through reference resistor 146. VDMR at 158 also biases hysterisis transistor 142 to turn on. If hysterisis switch 144 is closed, IINTR increases and VINTR is pulled to a lower voltage level via hysterisis transistor 142 that is turned on via VDMR at 158. Internal reference voltage VINTR at 150 is provided to the positive input of output amplifier 140 and set out in Equation I.

$$VINTR = VDD - (RB*IINTR) \qquad \text{Equation I}$$

Where, RB is equal to the resistance value of reference resistor 146.

Full wave rectifier 108, pull-up resistor 112, and filter capacitor 114 provide internal voltage VINT at 126 that is based on the activity level of differential input signals RXP at 102 and RXN at 104. Receiver amplifier 116 receives differential input signals RXP at 102 and RXN at 104 and provides differential output signals VD− at 122 and VD+ at 124. If the AC differential peak to peak VDM of differential input signals RXP at 102 and RXN at 104 is greater than zero volts, differential output signals VD− at 122 and VD+ at 124 alternate above and below the threshold voltages of the NMOS transistors 118 and 120.

If RXP at 102 is greater than RXN at 104, VD+ at 124 is greater than the threshold voltage of NMOS transistor 118 and VD− at 122 is less than the threshold voltage of NMOS transistor 120. As a result, NMOS transistor 118 turns on to conduct current and NMOS transistor 120 is turned off to not conduct substantially any current. Also, if RXN at 104 is greater than RXP at 102, VD− at 122 is greater than the threshold voltage of NMOS transistor 120 and VD+ at 124 is less than the threshold voltage of NMOS transistor 118. As a result, NMOS transistor 120 turns on to conduct current and NMOS transistor 118 turns off to not conduct substantially any current.

The alternating differential output signals VD− at 122 and VD+ at 124 alternatively turn on NMOS transistors 118 and 120 to provide full wave rectified current IINT. Filter capacitor 114 provides suitable low pass filtering and VINT at 126 is pulled lower via the full wave rectified current IINT. The larger the AC differential peak to peak VDM of differential input signals RXP at 102 and RXN at 104, the larger the difference in differential output signals VD− at 122 and VD+ at 124 and the larger the full wave rectified current IINT.

Larger AC differential peak to peak VDM of differential input signals RXP at 102 and RXN at 104 pull VINT at 126 lower. As VINT at 126 decreases below VINTR at 150, output amplifier 140 switches from providing a low logic level output that indicates electrical idle to a high logic level output that indicates differential input signals RXP at 102 and RXN at 104 are active and providing data bits. Also, VINT at 126 increases as AC differential peak to peak VDM of differential input signals RXP at 102 and RXN at 104 decrease, and as VINT at 126 increases above VINTR at 150, output amplifier 140 switches from providing a high logic level output in VOUT at 106 to providing a low logic level output in VOUT at 106 to indicate electrical idle.

In one embodiment, hysterisis switch 144 is closed as VOUT at 106 transitions to a low logic level to indicate electrical idle. This lowers VINTR at 150 to prevent multiple, false transitions or bounce in VOUT at 106. Also, hysterisis switch 144 is opened as VOUT at 106 transitions to a high logic level to indicate active mode. This raises VINTR at 150 to prevent multiple, false transitions or bounce in VOUT at 106.

In an AMB communications link in electrical idle, the AC differential peak to peak VDM of differential input signals RXP at 102 and RXN at 104 is substantially equal to zero volts and receiver amplifier 116 sets each of the differential output signals VD− at 122 and VD+ at 124 to substantially the threshold voltage of each of the NMOS transistors 118 and 120. This places each of the NMOS transistors 118 and 120 at the edge of conduction, where each of the NMOS transistors 118 and 120 draw negligible current and internal voltage VINT at 126 is given by Equation II.

$$VINT \cong VDD \qquad \text{Equation II}$$

With VINT at 126 substantially equal to VDD and VINTR at 150 less than VDD, output amplifier 140 provides a low logic level in VOUT at 106 to indicate electrical idle.

If differential input signals RXP at 102 and RXN at 104 become active, the AC differential peak to peak VDM of differential input signals RXP at 102 and RXN at 104 increases from zero volts to greater than or equal to 160 mV. Receiver amplifier 116 receives differential input signals RXP at 102 and RXN at 104 and provides differential output signals VD− at 122 and VD+ at 124 that alternate above and below the threshold voltages of NMOS transistors 118 and 120. NMOS transistors 118 and 120 are alternatively turned on to provide full wave rectified current IINT, which pulls VINT at 126 to a lower voltage. As VINT at 126 decreases below VINTR at 150, output amplifier 140 switches from providing a low logic level output to a high logic level output in VOUT at 106 that indicates differential input signals RXP at 102 and RXN at 104 are active.

VINTR at 150 is a DC reference voltage that corresponds to a threshold differential reference voltage VDIFFR that is based on the AC differential peak to peak VDM of differential input signals RXP at 102 and RXN at 104 in a communications link specification. In an AMB communications link, VDIFFR can be set to (160−0)/2 or 80 mV and VINTR at 150 is set to correspond to VDIFFR at 80 mV. Common mode feedback circuit 110 provides VDMR at 158 to bias reference transistor 136 and draw current IINTR through reference resistor 146 to set VINTR at 150. Equations III and IV describe the operation of electrical idle detection circuit 100.

$$VINT \geq VINTR \rightarrow VOUT = 0 \text{ for } |RXP - RXN|_{AVG} \leq VDIFFR \qquad \text{Equation III}$$

$$VINT \leq VINTR \rightarrow VOUT = 1 \text{ for } |RXP - RXN|_{AVG} \geq VDIFFR \qquad \text{Equation IV}$$

Where, VDIFFR is compared to the average of the absolute value of the value of RXP minus the value of RXN.

Full wave rectifier circuit 108 provides a suitably large bandwidth and a suitably large gain to detect active mode and electrical idle in differential input signals RXP at 102 and RXN at 104. Receiver amplifier 116 is configured to provide a moderate gain and very large bandwidth, such as greater than one half the data rate. Receiver amplifier 116 biases the common mode voltage level of differential output signals VD− at 122 and VD+ at 124 to be substantially equal to the threshold voltage of NMOS transistors 118 and 120. NMOS transistors 118 and 120, which are quiescently biased near the device conduction threshold (VTH), provide a suitably high voltage to current gain during rectification as set out in Equations V and VI. In Equation V, the change in drain current ID is proportional to gate voltage (VGS) minus VTH. In Equation VI, the normalized gradient in drain current ID, i.e. the change in ID with respect to ID, is inversely proportional to VGS minus VTH. If VGS is slightly larger than VTH, the change in ID is small and the change in ID with respect to ID is very large.

$$\Delta ID/\Delta VGS = K*(VGS-VTH) \quad \text{Equation V}$$

$$(\Delta ID/ID)/\Delta VGS = 2/(VGS-VTH) \quad \text{Equation VI}$$

Where, k is the gain of an NMOS transistor, such as each of NMOS transistors 118 and 120.

To determine VINT at 126 in full wave rectifier circuit 108, receiver amplifier 116 has a single-ended gain of AV and differential output signals VD+ at 124 and VD− at 122 are set out in Equations VII and VIII. In Equation VII, differential output signal VD+ at 124 is equal to VTH plus AV times the quantity of the difference in differential input signals RXP at 102 and RXN at 104. In Equation VIII, differential output signal VD− at 122 is equal to VTH minus AV times the quantity of the difference in differential input signals RXP at 102 and RXN at 104.

$$VD+ = VTH + (AV*(RXP-RXN)) \quad \text{Equation VII}$$

$$VD- = VTH - (AV*(RXP-RXN)) \quad \text{Equation VIII}$$

For each of the NMOS transistors 118 and 120 in saturation, the drain current ID is equal to one half times the transistor gain k times the square of the difference between VGS and VTH. If differential input signal RXP at 102 is greater than differential input signal RXN at 104, NMOS transistor 118 turns on and IINT is equal to one half times the transistor gain k times the square of the difference between VD+ and VTH. As set out in Equation IX, by substituting for VD+ from Equation VII and reducing, IINT is equal to one half times the transistor gain k times the square of the quantity of receiver amplifier 116 gain AV times the difference of differential input signals RXP at 102 and RXN at 104. Also, if differential input signal RXP at 102 is less than differential input signal RXN at 104, NMOS transistor 120 turns on and IINT is equal to one half times the transistor gain k times the square of the difference between VD− and VTH. As set out in Equation X, by substituting for VD− from Equation VIII and reducing, IINT is equal to one half times the transistor gain k times the square of the quantity of negative AV times the difference of differential input signals RXP at 102 and RXN at 104.

$$IINT = \frac{1}{2}*K*[(VD+)-VTH]^2 \quad \text{Equation IX}$$
$$= \frac{1}{2}*K*[VTH+AV*(RXP-RXN)-VTH]^2$$
$$= \frac{1}{2}*K*[AV*(RXP-RXN)]^2$$

$$IINT = \frac{1}{2}*K*[(VD-)-VTH]^2 \quad \text{Equation X}$$
$$= \frac{1}{2}*K*[VTH-AV*(RXP-RXN)-VTH]^2$$
$$= \frac{1}{2}*K*[-AV*(RXP-RXN)]^2$$

Thus, IINT over all of differential input signal RXP at 102 minus differential input signal RXN at 104 is equal to one half times the transistor gain k times the square of the quantity of AV times the difference of differential input signals RXP at 102 and RXN at 104, as set out in Equation XI.

$$IINT = \frac{1}{2}*K*[AV*(RXP-RXN)]^2 \quad \text{Equation XI}$$

The difference of differential input signals RXP at 102 and RXN at 104 is time varying and assumes levels from zero volts at a zero crossing to the peak to peak differential voltage near the middle of the eye of a data bit. Thus, IINT is time varying and filter capacitor 114 time averages the voltage VINT at 126. If the RC time constant of pull-up resistor 112 and filter capacitor 114 is set to one decade above a data bit unit interval, the high frequency components of IINT are substantially attenuated and VINT at 126 approaches a time averaged DC voltage level corresponding to the differential voltage of the eye of the data bit. For example, where one data bit unit interval is 208 picoseconds at 4.8 gigabits per second (Gb/s), the RC time constant is set equal to 2 nanoseconds (ns).

VINT at 126 is equal to VDD minus the resistance value RB of pull-up resistor 112 times the time averaged current IINTAVG, as set out in Equation XII.

$$VINT = VDD - (RB*IINTAVG) \quad \text{Equation XII}$$
$$= VDD - \left(\frac{1}{2}*RB*K*[AV*(RXP-RXN)]^2\right)\Big|_{AVG}$$

In operation of an AMB communications link, receiver amplifier 116 receives differential input signals RXP at 102 and RXN at 104 and provides differential output signals VD− at 122 and VD+ at 124. If the AC differential peak to peak VDM of differential input signals RXP at 102 and RXN at 104 is substantially zero volts, each of the differential output signals VD− at 122 and VD+ at 124 is substantially equal to the threshold voltage VTH of the NMOS transistors 118 and 120. IINT is substantially zero and VINT at 126 is substantially equal to VDD. VINTR at 150 is set to less than VDD and output amplifier 140 provides a low logic level in VOUT at 106 to indicate electrical idle. Hysterisis switch 144 is closed as VOUT at 106 transitions to the low logic level, which lowers VINTR at 150 to prevent multiple, false transitions or bounce in VOUT at 106.

If the AC differential peak to peak VDM of differential input signals RXP at 102 and RXN at 104 is greater than zero volts, differential output signals VD− at 122 and VD+ at 124 alternate above and below the threshold voltage VTH of NMOS transistors 118 and 120. The alternating differential output signals VD− at 122 and VD+ at 124 alternatively turn on NMOS transistors 118 and 120 to provide the time varying current IINT. Filter capacitor 114 provides suitable low pass filtering to time average VINT at 126. As VINT at 126 decreases below VINTR at 150, output amplifier 140 switches from providing a low logic level output to a high logic level output that indicates differential input signals RXP at 102 and RXN at 104 are active. Hysterisis switch 144 is opened as VOUT at 106 transitions to a high logic level, which raises VINTR at 150 to prevent multiple, false transitions or bounce in VOUT at 106.

Figure 5:
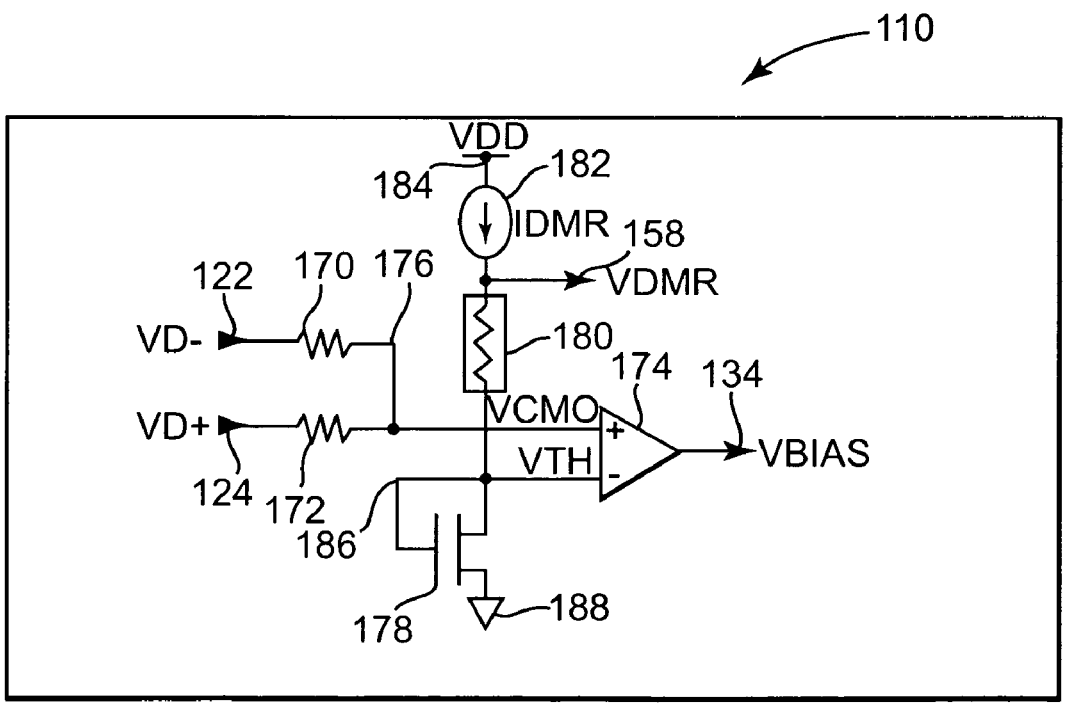
FIG. 5 is a diagram illustrating one embodiment of a common mode feedback circuit.

FIG. 5 is a diagram illustrating one embodiment of common mode feedback circuit 110. Common mode feedback circuit 110 receives differential output signals VD− at 122 and VD+ at 124 and provides bias voltage VBIAS at 134 and differential mode reference voltage VDMR at 158. Receiver amplifier 116 (shown in FIG. 4) receives VBIAS at 134 and adjusts the common mode voltage level of each of the differential output signals VD− at 122 and VD+ at 124 to be substantially equal to the threshold voltage VTH of each of the NMOS transistors 118 and 120. VDMR at 158 biases reference transistor 136 to turn on and draw current IINTR and provide internal reference voltage VINTR at 150. In one embodiment, VDMR at 158 also turns on hysterisis transistor 142.

Common mode feedback circuit 110 includes a negative differential input resistor 170, a positive differential input resistor 172, and a bias output amplifier 174. One side of input resistor 170 is electrically coupled to one side of input resistor 172 and to the positive input of bias output amplifier 174 via input path 176. Negative differential input resistor 170 receives differential output signal VD− at 122 and positive differential input resistor 172 receives differential output signal VD+ at 124 to provide an average common mode output voltage VCMO at 176.

Common mode feedback circuit 110 also includes a threshold reference transistor 178, a programmable resistor 180, and a constant current source 182. One end of the constant current source 182 is electrically coupled to VDD at 184. The other end of constant current source 182 is electrically coupled to one end of programmable resistor 180 at 158. The other end of programmable resistor 180 is electrically coupled to the negative input of bias output amplifier 174 and one side of the drain-source path and the gate of threshold reference transistor 178 via input path 186. The gate and one side of the drain-source path of threshold reference transistor 178 are coupled together to provide substantially threshold voltage VTH at 186. The other side of the drain-source path of threshold reference transistor 178 is electrically coupled to a reference, such as ground, at 188.

Constant current source 182 provides constant current IDMR that flows through programmable resistor 180 and threshold reference transistor 178 to produce VTH at 186. Bias output amplifier 174 compares VCMO at 176 to VTH at 186 and provides VBIAS at 134. Receiver amplifier 116 adjusts the common mode voltage level of each of the differential output signals VD− at 122 and VD+ at 124 to be substantially equal to VTH at 186, which results in VCMO at 176 being substantially equal to VTH at 186.

VDMR at 158 biases reference transistor 136 to sink current IINTR and provide VINTR at 150. As set out in Equation XIII, VDMR at 158 is equal to VTH plus the voltage across programmable resistor 180 that has a resistance value of RP. In one embodiment, resistance value RP of programmable resistor 180 is programmed to set VDMR at 158 equal to VDIFFR times the gain AV of receiver amplifier 116 as set out in Equation XIV.

$$VDMR = VTH + (IDMR * RP) \quad \text{Equation XIII}$$

$$VDMR = VDIFFR * AV \quad \text{Equation XIV}$$

As set out in Equation XV for reference transistor 136, in saturation the drain current IINTR is equal to one half times the transistor gain k times the square of the difference between VDMR at 158 and the threshold voltage VTH of reference transistor 136. By substituting for VDMR from Equation XIII and reducing, IINTR is equal to one half times the transistor gain k times the square of the constant current IDMR times the programmable resistance RP.

$$IINTR = \frac{1}{2} * K * [VDMR - VTH]^2 \quad \text{Equation XV}$$
$$= \frac{1}{2} * K * [(VTH + IDMR * RP) - VTH]^2$$
$$= \frac{1}{2} * K * [IDMR * RP]^2$$

As set out in Equation XVI, VINTR at 150 is equal to VDD minus the resistance value RB of reference resistor 146 times the current IINTR. By substituting for IINTR from Equation XV, VINTR at 150 is proportional to the square of IDMR times RP, where IDMR times RP is a component of VDMR at 158 as set out in Equation XIII. In one embodiment, VINTR corresponds to the threshold differential reference voltage VDIFFR that is related to VDMR as set out in Equation XIV.

$$VINTR = VDD - (RB * IINTR) \quad \text{Equation XVI}$$
$$= VDD - \left(RB * \frac{1}{2} * K * [IDMR * RP]^2\right)$$

Figure 6:
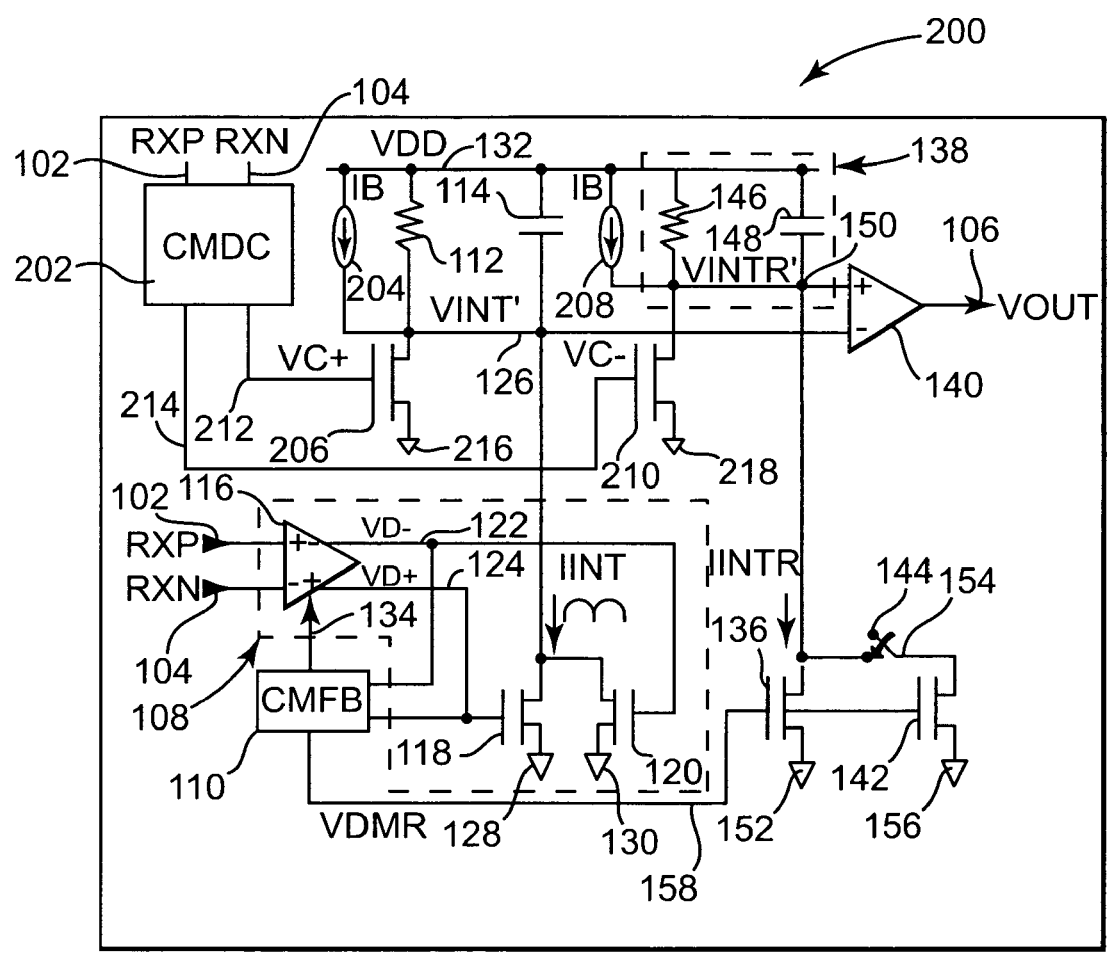
FIG. 6 is a diagram illustrating one embodiment of an electrical idle detection circuit including common mode voltage difference detection circuitry.

FIG. 6 is a diagram illustrating one embodiment of an electrical idle detection circuit 200. Electrical idle detection circuit 200 is similar to and can be employed in electrical idle detection circuit 28 to receive differential input signals of one channel in a serial communications link, such as serial communications link 26. Electrical idle detection circuit 200 receives positive differential input signal RXP at 102 and negative differential input signal RXN at 104 and provides output signal VOUT at 106. Output signal VOUT at 106 indicates whether differential input signals RXP at 102 and RXN at 104 are active or in electrical idle. In one embodiment, differential input signals RXP at 102 and RXN at 104 are signals in an AMB communications link. In other embodiments, differential input signals RXP at 102 and RXN at 104 are signals in any suitable communications link.

Electrical idle detection circuit 200 is similar to electrical idle detection circuit 100, with the addition of common mode voltage (VCM) difference detection circuitry. Electrical idle detection circuit 200 includes all of the components of electrical idle detection circuit 100 and these components are electrically coupled together and function as described in the description of FIG. 4. In addition, electrical idle detection circuit 200 includes a common mode detection circuit 202, a first current source 204, a positive common mode voltage transistor 206, a second current source 208, and a negative common mode voltage transistor 210. Electrical idle detection circuit 200 detects whether the differential input signals RXP at 102 and RXN at 104 are active or in electrical idle via the VDM and/or the DC component of the VCM of differential input signals RXP at 102 and RXN at 104.

Common mode detection circuit 202 is electrically coupled to the gate of transistor 206 via positive common mode voltage path 212 and to the gate of transistor 208 via negative common mode voltage path 214. One side of first current source 204 is electrically coupled to power at 132 and the other side of first current source 204 is electrically coupled to one side of the drain-source path of transistor 206 and the negative input of output amplifier 140 via negative input path 126. The other side of the drain-source path of transistor 206 is electrically coupled to a reference, such as ground, at 216. One side of second current source 208 is electrically coupled to power at 132 and the other side of second current source 208 is electrically coupled to one side of the drain-source path of transistor 210 and the positive input of output amplifier 140 via positive input path 150. The other side of the drain-source path of transistor 210 is electrically coupled to a reference, such as ground, at 218.

Common mode detection circuit 202 receives differential input signals RXP at 102 and RXN at 104 and provides positive common mode voltage signal VC+ and negative common mode voltage signal VC−. Common mode detection circuit 202 filters off the AC peak to peak noise of the VCM of differential input signals RXP at 102 and RXN at 104 and compares the DC component of the VCM to a common mode reference voltage VCMR. If the DC component of the VCM is higher than the VCMR, differential input signals RXP at 102 and RXN at 104 are active. If the DC component of the VCM is lower than the VCMR, differential input signals RXP at 102 and RXN at 104 are in electrical idle.

Common mode detection circuit 202 sets positive common mode voltage signal VC+ high and negative common mode voltage signal VC− low if the DC component of the VCM is higher than the VCMR. Transistor 206 is turned on to pull VINT' at 126 to a lower voltage level and transistor 210 is turned off to maintain VINTR' at 150 at a higher voltage level. Output amplifier 140 compares VINT' at 126 to VINTR' at 150 and provides a high voltage level in VOUT at 106 to indicate differential input signals RXP at 102 and RXN at 104 are active.

Common mode detection circuit 202 sets positive common mode voltage signal VC+ low and negative common mode voltage signal VC− high if the DC component of the VCM is lower than the VCMR. Transistor 210 is turned on to pull VINTR' at 150 to a lower voltage level and transistor 206 is turned off to maintain VINT' at 126 at a higher voltage level. Output amplifier 140 compares VINT' at 126 to VINTR' at 150 and provides a low voltage level in VOUT at 106 to indicate differential input signals RXP at 102 and RXN at 104 are in electrical idle.

If the DC component of the VCM is substantially equal to the VCMR, common mode detection circuit 202 sets positive common mode voltage signal VC+ and negative common mode voltage signal VC− to substantially the same voltage level. This biases each of the transistors 206 and 210 to conduct current IB from each of the first and second current sources 204 and 208, respectively, and substantially takes the common mode detection circuit 202 and transistors 206 and 210 out of the operation of electrical idle detection circuit 200.

Electrical idle detection circuit 200 operates as previously described in the description of FIG. 4 to detect the AC differential peak to peak voltage of the VDM, including operation of full wave rectifier 108, common mode feedback circuit 110, reference transistor 136, hysteresis switch 144, and hysterisis transistor 142. As set out in Equation XVII, internal voltage VINT' is different than internal voltage VINT of Equation XII, as VINT' includes a component for current IB from first current source 204 and a component for current I206 through transistor 206. Also, as set out in Equation XVIII, internal reference voltage VINTR' is different than internal reference voltage VINTR of Equation XVI, as VINTR' includes a component for current IB from second current source 208 and a component for current I210 through transistor 210.

$$VINT' = VDD - (RB*(IINTAVG - IB + I206)) \quad \text{Equation XVII}$$
$$= VDD + (RB*(IB - I206)) -$$
$$\left(\frac{1}{2}*RB*K*[AV*(RXP-RXN)]^2\right)\bigg|_{AVG}$$

$$VINTR' = VDD - (RB*(IINTR - IB + I210)) \quad \text{Equation XVIII}$$
$$= VDD + (RB*(IB - I210)) -$$
$$\left(\frac{1}{2}*RB*K*[IDMR*RP]^2\right)$$

Figure 7:
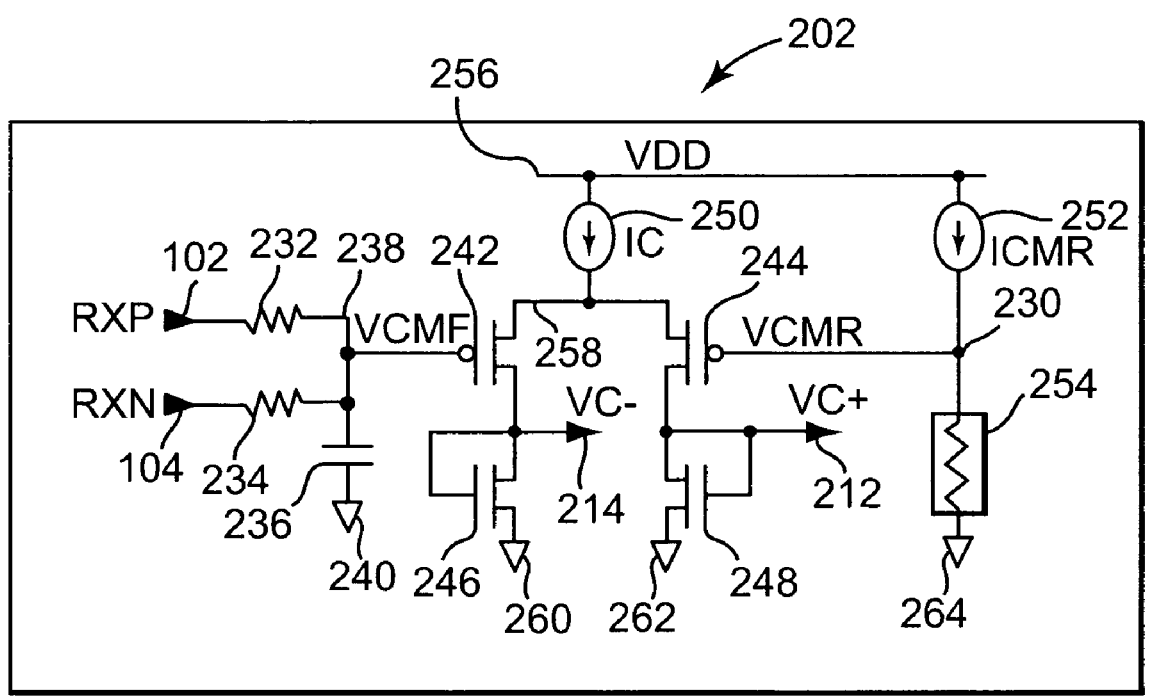
FIG. 7 is a diagram illustrating one embodiment of a common mode detection circuit.

FIG. 7 is a diagram illustrating one embodiment of common mode detection circuit 202. Common mode detection circuit 202 receives differential input signals RXP at 102 and RXN at 104 and provides positive common mode voltage signal VC+ at 212 and negative common mode voltage VC− at 214. Common mode detection circuit 202 detects whether the DC component of the common mode voltage VCM of differential input signals RXP at 102 and RXN at 104 is greater than, less than, or substantially equal to the common mode reference voltage VCMR at 230. If the DC component of the VCM of differential input signals RXP at 102 and RXN at 104 is greater than VCMR at 230, differential input signals RXP at 102 and RXN at 104 are active. If the DC component of the VCM of differential input signals RXP at 102 and RXN at 104 is less than VCMR at 230, differential input signals RXP at 102 and RXN at 104 are in electrical idle. In the AMB communications link of FIG. 2, the DC component of the VCM is 120 mV or more in active mode and 50 mV or less in electrical idle. In one embodiment, VCMR at 230 is set to the average of these limits or (120+50)/2 or 85 mV.

Common mode detection circuit 202 includes a first averaging resistor 232, a second averaging resistor 234, and an AC filter capacitor 236. One side of first averaging resistor 232 is electrically coupled to one side of second averaging resistor 234 and to one side of filter capacitor 236 via common mode voltage path 238. The other side of filter capacitor 236 is electrically coupled to a reference, such as ground, at 240.

First averaging resistor 232 receives differential input signal RXP at 102 and second averaging resistor 234 receives differential input signal RXN at 104. First averaging resistor 232 and second averaging resistor 234 provide the average VCM of differential input signals RXP at 102 and RXN at 104 to filter capacitor 236. Filter capacitor 236 filters off and attenuates the AC peak to peak noise of the VCM to provide a filtered common mode voltage VCMF at 238. Filter capacitor 236 operates as a low pass filter to filter off the AC peak to peak noise of the VCM.

In one embodiment of the AMB communications link, if the corner frequency of the low pass filter of filter capacitor 236 is set one decade below the AC noise frequency of 80 MHz, resulting in a corner frequency of 80/10 or 8 MHz, the noise amplitude is reduced to one tenth of its original value. However, the resulting bandwidth is too low for detection times of 10 ns and 20 ns. Placement of the corner frequency of the low pass filter of filter capacitor 236 at 40 MHz provides a response time that meets the detection times of 10 ns and 20 ns and attenuates the common mode voltage fluctuations so as to not allow for false transitions into and out of electrical idle.

Common mode detection circuit 202 also includes a pair of p-channel metal oxide semiconductor (PMOS) transistors 242 and 244, a pair of NMOS transistors 246 and 248, an IC constant current source 250, a common mode reference current source 252, and a common mode reference programmable resistor 254. One side of constant current source 250 is electrically coupled to VDD at 256 and the other side of constant current source 250 is electrically coupled to one side of the drain-source path of PMOS transistor 242 and one side of the drain-source path of PMOS transistor 244 via current path 258. The other side of the drain-source path of PMOS transistor 242 is electrically coupled to the gate and one side of the drain-source path of NMOS transistor 246 at 214. The other side of the drain-source path of NMOS transistor 246 is electrically coupled to a reference, such as ground, at 260. The other side of the drain-source path of PMOS transistor 244 is electrically coupled to the gate and one side of the drain-source path of NMOS transistor 248 at 212. The other side of the drain-source path of NMOS transistor 248 is electrically coupled to a reference, such as ground, at 262. The gate of PMOS transistor 242 is electrically coupled to first averaging resistor 232, second averaging resistor 234, and filter capacitor 236 via common mode voltage path 238.

One side of the common mode reference current source 252 is electrically coupled to VDD at 256. The other side of common mode reference current source 252 is electrically coupled to the gate of PMOS transistor 244 and one side of the programmable resistor 254 via reference voltage path 230. The other side of the programmable resistor 254 is electrically coupled to a reference, such as ground, at 264. Common mode reference current source 252 provides common mode reference current ICMR through programmable resistor 254, which is programmed to provide VCMR at 230. In one embodiment, VCMR is substantially equal to 85 mV.

In operation, first averaging resistor 232 receives differential input signal RXP at 102 and second averaging resistor 234 receives differential input signal RXN at 104 to provide the average VCM of differential input signals RXP at 102 and RXN at 104 to filter capacitor 236. Filter capacitor 236 filters off and attenuates the AC peak to peak noise of the VCM to provide VCMF at 238.

If VCMF at 238 is greater than VCMR at 230, PMOS transistor 242 is biased off and PMOS transistor 244 is biased on. With PMOS transistor 242 biased off, VC− at 214 is pulled to a low voltage level that biases off transistor 210 to maintain VINTR' at 150 at a higher voltage level. With PMOS transistor 244 biased on, VC+ at 212 is pulled to a high voltage level to bias on transistor 206 and pull VINT' at 126 to a lower voltage level. Output amplifier 140 compares VINT' at 126 to VINTR' at 150 and provides a high voltage level in VOUT at 106 to indicate differential input signals RXP at 102 and RXN at 104 are active.

If VCMF at 238 is less than VCMR at 230, PMOS transistor 242 is biased on and PMOS transistor 244 is biased off. With PMOS transistor 242 biased on, VC− at 214 is pulled to a high voltage level that biases on transistor 210 to pull VINTR' at 150 to a lower voltage level. With PMOS transistor 244 biased off, VC+ at 212 is pulled to a low voltage level to bias off transistor 206 and maintain VINT' at 126 at a high voltage level. Output amplifier 140 compares VINT' at 126 to VINTR' at 150 and provides a low voltage level in VOUT at 106 to indicate differential input signals RXP at 102 and RXN at 104 are in electrical idle.

If VCMF is substantially equal to VCMR, transistors 242 and 244 are equally biased on to sink one half of the current IC. Common mode detection circuit 202 sets positive common mode voltage signal VC+ and negative common mode voltage signal VC− to substantially the same voltage level, which biases each of the transistors 206 and 210 to conduct current IB from each of the first and second current sources 204 and 208, respectively, and substantially takes the common mode detection circuit 202 and transistors 206 and 210 out of the operation of electrical idle detection circuit 200. In one embodiment, the current IB is set to be substantially one half the current IC.

Figure 8:
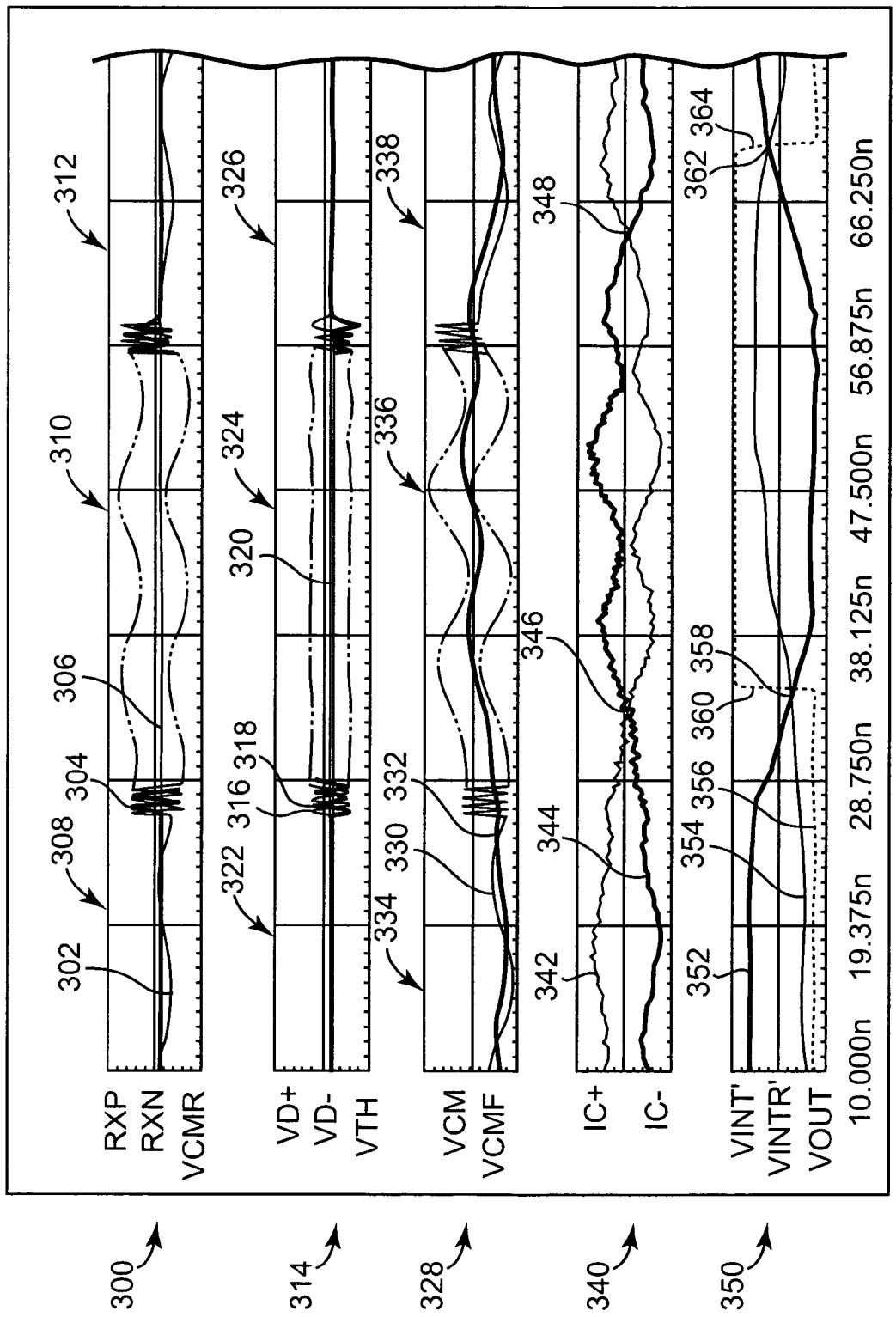
FIG. 8 is a diagram illustrating signal waveforms during operation of an electrical idle detection circuit.

FIG. 8 is a diagram illustrating signal waveforms during operation of electrical idle detection circuit 200. At 300, positive differential input signal RXP at 302 and negative differential input signal RXN at 304 are in electrical idle at 308, active at 310, and back into electrical idle at 312. In electrical idle at 308 and 312, the differential voltage between positive differential input signal RXP at 302 and negative differential input signal RXN at 304 is substantially zero, where positive differential input signal RXP at 302 and negative differential input signal RXN at 304 include near-ground common mode modulation. In active mode at 310, positive differential input signal RXP at 302 and negative differential input signal RXN at 304 include peak to peak oscillations of about 200 mV. Also, common mode reference voltage VCMR at 306 is substantially constant at 85 mV.

At 314, the differential output signals VD+ at 316 and VD− at 318 indicate electrical idle at 322, active mode at 324, and electrical idle at 326. In electrical idle at 322 and 326, differential output signals VD+ at 316 and VD− at 318 are maintained at the NMOS threshold voltage VTH at 320 via common mode feedback circuit 110 and bias signal VBIAS. Receiver amplifier 116 receives the bias signal VBIAS and differential input signals RXP at 302 and RXN at 304 and provides each of the differential output signals VD+ at 316 and VD− at 318 with a common mode voltage of substantially the threshold voltage VTH at 320. In active mode at 324, differential output signals VD+ at 316 and VD− at 318 include peak to peak oscillations of about 240 mV. Threshold voltage VTH at 320 is substantially constant at about 340 mV.

At 328, common mode detection circuit 202 receives differential input signal RXP at 302 and negative differential input signal RXN at 304 and provides the averaged common mode voltage VCM at 330 and the filtered common mode voltage VCMF at 332. The VCM at 330 and the VCMF at 332 are lower during electrical idle at 334, increase in active mode at 336, and decrease in electrical idle at 338. In active mode at 336, the VCM at 320 includes high frequency noise from differential input signals RXP at 302 and RXN at 304. This high frequency noise is filtered out of the VCMF at 332.

At 340, the current IC+ at 342 through positive common mode voltage transistor 206 and the current IC− at 344 through negative common mode voltage transistor 210 are controlled via common mode detection circuit 202. In electrical idle, IC+ at 342 is less than IC− at 344 and output amplifier 140 provides VOUT at 106 at a low voltage level. In active mode, VCMF at 332 increases to a larger voltage than the 85 mV of VCMR at 306 and, at 346, IC+ at 342 becomes larger than IC− at 344. Output amplifier 140 provides VOUT at 106 at a high voltage level. At 348, in electrical idle, IC+ at 342 becomes less than IC− at 344 and output amplifier 140 provides VOUT at 106 at a low voltage level.

At 350, VINT' at 352 is at a high voltage level and VINTR' at 354 is at a low voltage level in electrical idle, and output amplifier 140 provides VOUT at 356 at a low voltage level. As IC+ at 342 increases and IC− at 344 decreases in active mode, VINT' at 352 decreases and VINTR' at 354 increases to cross at 358. Output amplifier 140 provides VOUT at 356 at a high voltage level at 360. As IC+ at 342 decreases and IC− at 344 increases in electrical idle, VINT' at 352 increases and VINTR' at 354 decreases to cross at 362. Output amplifier 140 provides VOUT at 356 at a low voltage level at 364.

Figure 9:
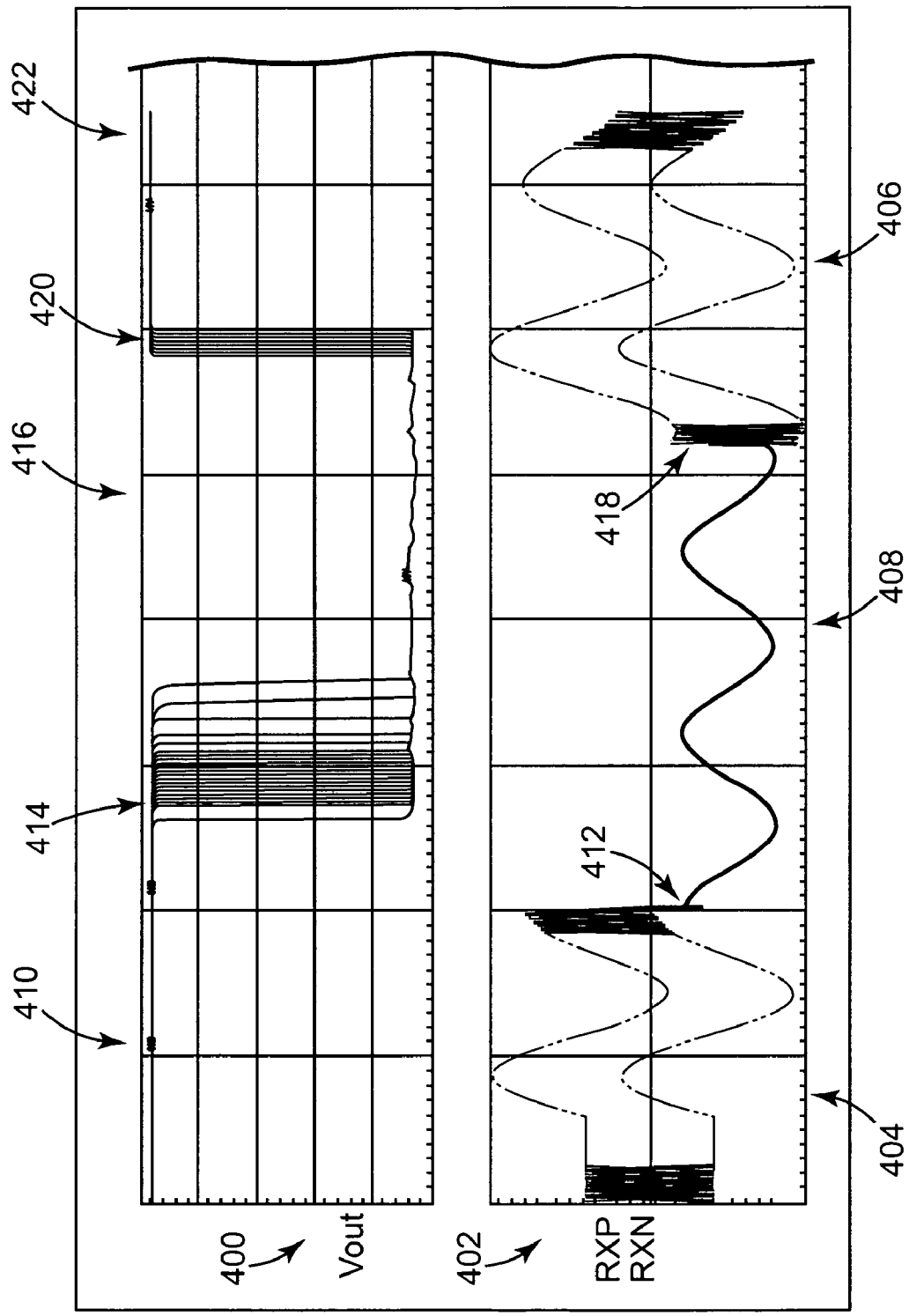
FIG. 9 is a diagram illustrating signal waveforms in a Monte Carlo analysis of an electrical idle detection circuit.

FIG. 9 is a diagram illustrating signal waveforms in a Montecarlo analysis of electrical idle detection circuit 200. Output receiver 140 provides VOUT at 400 in response to differential input signals RXP and RXN at 402. In active mode at 404 and 406, differential input signals RXP and RXN at 402 provide differential data bit signals at a high frequency rate. The high frequency data bit signals ride on a low frequency oscillation in the common mode voltage of differential input signals RXP and RXN at 402. In electrical idle at 408, the difference between differential input signals RXP and RXN at 402 is substantially zero and the common mode voltage decreases to a lower average common mode voltage.

At 410, VOUT at 400 is at a high voltage level to indicate that differential input signals RXP and RXN at 402 are active at 404. At 412, differential input signals RXP and RXN at 402 transition to electrical idle and at 414 VOUT at 400 transitions to a low voltage level to indicate that differential input signals RXP and RXN at 402 are in electrical idle at 408. At 416, VOUT at 400 remains at a low voltage level to indicate that differential input signals RXP and RXN at 402 are in electrical idle at 408. At 418, differential input signals RXP and RXN at 402 transition to active mode and at 420 VOUT at 400 transitions to a high voltage level to indicate that differential input signals RXP and RXN at 402 are active at 406. At 422, VOUT at 400 remains at a high voltage level to indicate that differential input signals RXP and RXN at 402 are active at 406.

The detection time between the transition from active to electrical idle at 412 and indicating electrical idle at 414 is less than 15 ns. The detection time between the transition from electrical idle to active mode at 418 and indicating active mode 420 is less than 7 ns. These detection times are within detection times of 20 ns for going into electrical idle and 10 ns for going into active mode of the AMB communications link specification of FIG. 2.

The electrical idle detection circuits 100 and 200 are configured to receive differential input signals and provide a rectified output signal based on the differential input signals. If the differential input signals are active, the rectified output signal changes an internal voltage to provide an output signal that indicates the differential input signals are active. If the differential input signals are in electrical idle, the rectified output signal is inactive and the internal voltage remains unchanged to provide an output signal that indicates the differential input signals are in electrical idle.

Also, electrical idle detection circuits 28 and 200 are configured to receive differential input signals and reduce the common mode voltage noise in the differential input signals to provide a filtered common mode voltage. A common mode detection circuit provides output signals based on the filtered common mode voltage to indicate whether the differential input signals are active or in electrical idle.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An electrical idle detection circuit, comprising:
    a full wave rectifier configured to receive differential input signals and provide a rectified output signal based on the differential input signals; and
    a first amplifier configured to receive a first input signal based on the rectified output signal and a second input signal based on a reference signal and to provide an output signal that indicates the differential input signals are one of active and in electrical idle based on the first input signal and the second input signal.

2. The electrical idle detection circuit of claim 1, comprising:
    a low pass filter configured to filter the rectified output signal and provide a filtered rectified output signal, wherein the first input signal includes the filtered rectified output signal.

3. The electrical idle detection circuit of claim 1, wherein the full wave rectifier comprises:
    a second amplifier configured to receive the differential input signals and provide differential output signals; and
    a transistor pair configured to receive the differential output signals and provide the rectified output signal.

4. The electrical idle detection circuit of claim 3, wherein the second amplifier is configured to have a bandwidth greater than one half the data rate of the differential input signals and the transistor pair is configured to provide a high voltage to current gain.

5. The electrical idle detection circuit of claim 3, comprising:
    a common mode feedback circuit configured to average the differential output signals and provide a bias voltage, wherein the second amplifier receives the bias voltage and adjusts common mode levels in the differential output signals based on the bias voltage.

6. The electrical idle detection circuit of claim 5, wherein the common mode feedback circuit is configured to adjust the bias voltage to a threshold voltage of the transistor pair.

7. The electrical idle detection circuit of claim 5, wherein the common mode feedback circuit comprises:
    a resistor network configured to provide a common mode output voltage; and
    a third amplifier configured to compare the common mode output voltage and a reference voltage to provide the bias voltage.

8. The electrical idle detection circuit of claim 1, comprising:
    a hysteresis circuit configured to shift the reference signal to avoid multiple transitions of the output signal upon entry into and exit out of electrical idle.

9. An electrical idle detection circuit, comprising:
    a common mode difference detector configured to receive differential input signals and reduce common mode voltage noise in the differential input signals to provide a filtered common mode voltage and to provide common mode differential output signals based on the filtered common mode voltage;
    a first switch controlled via one of the common mode differential output signals to shift a first input signal;
    a second switch controlled via another one of the common mode differential output signals to shift a second input signal that is based on a reference signal; and
    a first amplifier configured to receive the first input signal and the second input signal and to provide an output signal that indicates the differential input signals are one of active and in electrical idle based on the first input signal and the second input signal.

10. The electrical idle detection circuit of claim 9, wherein the common mode difference detector comprises:
    a resistor network configured to provide a common mode voltage;
    a filter configured to low pass filter the common mode voltage to provide the filtered common mode voltage; and
    a transistor pair configured to receive the filtered common mode voltage and a common mode reference signal and to provide the common mode differential output signals.

11. The electrical idle detection circuit of claim 9, comprising:
    a hysteresis circuit configured to shift the reference signal to avoid multiple transitions of the output signal upon entry into and exit out of electrical idle.

12. The electrical idle detection circuit of claim 9, comprising a full wave rectifier configured to receive the differential input signals and provide a rectified output signal based on the differential input signals, wherein the first input signal is based on the rectified output signal.

13. The electrical idle detection circuit of claim 12, comprising:

a low pass filter configured to filter the rectified output signal and provide a filtered rectified output signal, wherein the first input signal includes the filtered rectified output signal.

14. The electrical idle detection circuit of claim 12, wherein the full wave rectifier comprises:
   a second amplifier configured to receive the differential input signals and provide differential output signals; and
   a transistor pair configured to receive the differential output signals and provide the rectified output signal.

15. The electrical idle detection circuit of claim 14, comprising:
   a common mode feedback circuit configured to average the differential output signals and provide a bias voltage, wherein the second amplifier receives the bias voltage and adjusts common mode levels in the differential output signals based on the bias voltage.

16. An electrical idle detection circuit, comprising:
   means for rectifying differential input signals to provide a rectified output signal based on the differential input signals; and
   means for comparing a first input signal that is based on the rectified output signal and a second input signal that is based on a reference signal to provide an output signal that indicates the differential input signals are one of active and in electrical idle.

17. The electrical idle detection circuit of claim 16, comprising:
   means for reducing common mode voltage noise in the differential input signals to provide a filtered common mode voltage;
   means for outputting differential output signals based on the filtered common mode voltage;
   means for shifting the first input signal via one of the differential output signals; and
   means for shifting the second input signal via another one of the differential output signals.

18. The electrical idle detection circuit of claim 16, comprising:
   means for filtering the rectified output signal to provide a filtered rectified output signal in the first input signal.

19. The electrical idle detection circuit of claim 16, comprising:
   means for averaging differential output signals to provide a bias voltage based on a common mode voltage of the differential output signals, and wherein the means for rectifying comprises:
      means for comparing the differential input signals to provide the differential output signals and adjust the common mode voltage of the differential output signals via the bias voltage.

20. The electrical idle detection circuit of claim 16, comprising:
   means for shifting the reference signal to avoid multiple transitions of the output signal upon entry into and exit out of electrical idle.

* * * * *